US012117176B1

(12) United States Patent
Wardrop

(10) Patent No.: US 12,117,176 B1
(45) Date of Patent: Oct. 15, 2024

(54) ELECTRIC FIREPLACE WITH HEAT RADIATING, FAUX MATERIALS

(71) Applicant: Hybrid Energies Alternative Technologies Inc., West Vancouver (CA)

(72) Inventor: Walter Wardrop, West Vancouver (CA)

(73) Assignee: Hybrid Energies Alternative Technologies, Inc. (CA)

(*) Notice: Subject to any disclaimer, the term of this patent is extended or adjusted under 35 U.S.C. 154(b) by 0 days.

(21) Appl. No.: 18/500,100

(22) Filed: Nov. 1, 2023

(51) Int. Cl.

| | |
|---|---|
| ***F24B 1/18*** | (2006.01) |
| ***F24D 13/02*** | (2006.01) |
| ***H05B 3/28*** | (2006.01) |

(52) U.S. Cl.
CPC ............ *F24B 1/1808* (2013.01); *F24D 13/02* (2013.01); *H05B 3/283* (2013.01); *H05B 2203/014* (2013.01)

(58) Field of Classification Search
CPC .......... F24B 1/1808; F24B 3/00; F24D 13/02; F24D 13/00; F24D 13/024; H05B 3/283; H05B 3/008; H05B 3/286; H05B 2203/014; H05B 1/0244; H05B 1/0277; F24C 3/006; F24C 7/00; F24C 7/008; F24C 7/04; F24C 7/043; F24C 7/004; F24C 15/06; F24H 3/022
USPC ................ 431/125; 392/348, 360, 361, 373; 126/500, 66, 67; 219/209, 213
IPC ................ F24B 1/18,1/197, 1/195, 3/00; F24D 13/02; H05B 3/28; F24C 15/06; F24H 3/02
See application file for complete search history.

(56) References Cited

U.S. PATENT DOCUMENTS

| | | | | | |
|---|---|---|---|---|---|
| 566,564 | A * | 8/1896 | Dewey | F24C 7/004 | 472/65 |
| 893,994 | A * | 7/1908 | Green | F24C 7/004 | 392/376 |
| 1,010,101 | A * | 11/1911 | Weaver | F24C 7/004 | D26/101 |
| 1,248,637 | A * | 12/1917 | Eddy | F24C 7/004 | 392/375 |
| 1,336,500 | A * | 4/1920 | Berry | F24C 7/004 | 472/65 |
| 1,404,497 | A * | 1/1922 | Vetter | F24C 7/004 | D23/409 |
| 1,432,942 | A * | 10/1922 | Zei | A63J 5/023 | 472/65 |
| 1,524,075 | A * | 1/1925 | Yokel | F24C 7/043 | 338/234 |

(Continued)

FOREIGN PATENT DOCUMENTS

| | | | | |
|---|---|---|---|---|
| BG | 767 | Y1 * | 9/2005 | F24B 1/185 |
| EP | 0285767 | | 10/1988 | |

(Continued)

*Primary Examiner* — Ko-Wei Lin
(74) *Attorney, Agent, or Firm* — Marc Baumgartner; Baumgartner Patent Law, LLC

(57) ABSTRACT

An electric fireplace for use with a power source, the electric fireplace comprising: a housing; a glass front which is retained by the housing, the housing and the glass front defining an inner space; a set of heat radiating logs housed in the inner space, each heat radiating log including a body with a heat radiating element therein; and an electrical line in electrical communication with the heat radiating element of the heat radiating logs.

17 Claims, 6 Drawing Sheets

(56) References Cited

U.S. PATENT DOCUMENTS

| | | | | |
|---|---|---|---|---|
| 1,707,982 | A * | 4/1929 | Humphrey | F24C 7/043 219/541 |
| 1,827,941 | A * | 10/1931 | Gross | F24C 7/004 362/808 |
| 2,495,788 | A * | 1/1950 | Trist | F24C 7/043 392/440 |
| 3,742,189 | A * | 6/1973 | Conroy | F24C 7/004 D23/343 |
| 5,678,534 | A * | 10/1997 | Fleming | F24B 1/006 126/92 R |
| 8,480,007 | B2 * | 7/2013 | Kaneiwa | F24H 9/0073 237/53 |
| 10,145,562 | B1 * | 12/2018 | Swanson | F24C 7/004 |
| 10,247,375 | B1 * | 4/2019 | Lu | F21S 10/043 |
| 10,711,964 | B2 | 7/2020 | Jones | |
| 10,762,805 | B1 * | 9/2020 | Zhou | F24B 1/1808 |
| 10,845,090 | B2 | 11/2020 | Crowe | |
| 2002/0166554 | A1 * | 11/2002 | Berg | F24B 1/1808 40/428 |
| 2003/0156828 | A1 * | 8/2003 | Jamieson | F24C 7/004 40/427 |
| 2006/0099565 | A1 * | 5/2006 | Rosserot | G09B 25/08 434/365 |
| 2011/0214342 | A1 * | 9/2011 | Burgi | F24C 3/006 44/535 |
| 2017/0211814 | A1 * | 7/2017 | Bourne | F24C 15/06 |
| 2018/0098382 | A1 | 4/2018 | Kaylor | |
| 2021/0372627 | A1 | 12/2021 | Walker | |
| 2022/0146068 | A1 | 5/2022 | Crowe | |

FOREIGN PATENT DOCUMENTS

| | | | | |
|---|---|---|---|---|
| GB | 2205939 | A * | 12/1988 | F24C 7/004 |
| GB | 2256040 | A * | 11/1992 | F24C 7/004 |

* cited by examiner

ELECTRIC FIREPLACE WITH HEAT RADIATING, FAUX MATERIALS

CROSS REFERENCE TO RELATED APPLICATIONS

The present invention is related to and claims the benefit of Canadian Patent Application Serial No. 3198612, filed on May 4, 2023, and entitled ELECTRIC FIREPLACE WITH HEAT RADIATING, FAUX MATERIALS, which is hereby incorporated in its entirety including all tables, figures, and claims.

FIELD

The present technology is directed to an electric fireplace in which the heat source and the display material are integrated into heat radiating material. More specifically, it is an electric fireplace with faux logs that include a resistive wire within the body of the faux log.

BACKGROUND

US Patent Application Publication No. 20220146068 discloses an electric fireplace that includes a fireplace housing and an electrical insert. The fireplace housing includes a base panel having a base opening a back panel and at least one side panel. The electrical insert is sized and shaped to fit and be supported and retained within the base opening. Additionally, the electrical insert can include a heater, and a controller including a processor that is configured to control operation of the electric fireplace. Further, each of the base panel, the back panel and the at least one side panel can be manufactured and installed independently of one another. The fireplace housing can further include a front frame that is manufactured and installed independently of each of the base panel, the back panel and the at least one side panel. Still further, at least one of the back panel and the at least one side panel can be foldable. The heat generator is independent from the logs, which are strictly decorative.

U.S. Pat. No. 10,711,964 discloses a flame simulating assembly with a reflected flickering light that includes only one light source. Light from the light source passes through a rotating flicker element onto an angled reflector, or mirror, that reflects light up onto a simulated fuel bed and the some of the light is reflected off of the flicker elements towards a flame screen to create a simulated flame. The clipping flicker elements creates a fluttering light effect due to the flicker elements “intermittently clipping” into the light path. This fluctuating light is reflected onto the logs and ember bed in front and creates a dancing effect, which simulates glowing embers. The logs and the heater are independent from one another, and the logs are strictly decorative.

US Patent Application Publication No. 20180098382 discloses a simulated fireplace and heater having a housing with a cylindrically concave front display area. The housing includes a flange that acts as a decorative bezel. Located above the concave display area is a concave panel that is curved similarly to the concave front display area. Located behind the concave panel is an electric heater that draws air from inside the housing and moves it across heating elements. Heated air then is exhausted through apertures in the concave panel. An illuminator is located inside the housing that projects light onto the underside of a semi-translucent log and a rotating flicker element. The flicker element reflects light to a diffusing panel that is located behind the log. The logs and the heater are independent from one another, and the logs are strictly decorative.

US Patent Application Publication No. 20210372627 discloses an electric fireplace system for simulating the light and sound effects of real burning fuel. The system includes modular components that are configured to be packaged, shipped, stored and assembled in a deconstructed state. The electric fireplace system comprising a modular fireplace insert comprising an insert housing that defines a cavity. A simulated fuel source for simulating a fire display, the simulated fuel source includes a first housing that is configured to be positioned in the insert housing. A heater assembly for generating warm air, the heater assembly including a second housing that is configured to be positioned in the insert housing at a positioned spaced from and above the simulated fuel source within the cavity of the insert housing. The logs and the heater are independent from one another, and the logs are strictly decorative.

U.S. Pat. No. 10,845,090 discloses a heating system which may include at least two different types of heating elements. The heating elements may include at least one infrared heating element and at least one halogen lamp. The heating elements may be positioned within a heating section of a duct through which air flows to be heated by the heating elements, which air flow may be driven by a fan. The heating system may be incorporated into a variety of heating devices, such as electric fireplaces and space heaters. The logs and the heater are independent from one another, and the logs are strictly decorative.

European Patent Application EP0285767 discloses a radiant body for fireplaces which comprises a combustion chamber, at least one air intake, at least one burner, a pilot flame, ceramic logs, a valve to regulate and control gas, ceramic panels to close the front and sides of the combustion chamber, the radiant body including in its upper portion a fume collection chamber connected to the combustion chamber and connected by a conduit to a delivery of air of combustion for the pilot flame. The logs and the radiant body are independent from one another, and the logs are strictly decorative.

What is needed is an electric fireplace in which the display materials each include a heat radiating element. It would be preferable if the heat radiating element was a resistive wire. It would be further preferable if the resistive wire was in a display log, extended a substantial length of the log and was retained within the body of the log. It would be further preferable if the log included a reflector to reflect heat out from the fireplace. It would be further preferable if the reflector was a black ceramic material. It would be further preferable if the electric fireplace included at least one fan to urge warmed air to into the ambient environment.

SUMMARY

The present technology is an electric fireplace in which the display materials each include a heat radiating element. The heat radiating element is a resistive wire in a display log. The resistive wire extends a substantial length of the log and is retained within the body of the log. The log includes a reflector to reflect heat out from the fireplace into the ambient environment. The reflector is a black ceramic glass. The electric fireplace includes at least one fan to urge warmed air to into the ambient environment.

In one embodiment an electric fireplace is provided for use with a power source, the electric fireplace comprising: a housing; a glass front which is retained by the housing, the housing and the glass front defining an inner space; a set of display logs housed in the inner space, each display log including a body with a heat radiating element therein; and an electrical line in electrical communication with the heat radiating element of the display logs.

In the electric fireplace, the heat radiating element may be a resistive wire.

In the electric fireplace, the resistive wire may have a tortuous path.

In the electric fireplace, the body of each display log may include a heat reflective material.

In the electric fireplace, the heat reflective material may be a black ceramic material.

In the electric fireplace, the display logs may be arranged in the set such that the heat reflective material radiates heat outward to an ambient environment.

The electric fireplace may further comprise at least one fan which is housed in the inner space.

In another embodiment, a heat radiating faux log is provided for use in an electric fireplace or an electric firepit, the heat radiating faux log including a body and a heat radiating element therein.

In the heat radiating faux log, the heat radiating element may be a resistive wire.

In the heat radiating faux log, the resistive wire may have a tortuous path.

The heat radiating faux log may further comprise a heat reflective layer.

In the heat radiating faux log, the heat reflective layer may be a black ceramic material.

The display log, which is the heat radiating faux log, may further comprise an interior of the body and a plurality of light emitting diodes in the interior of the body of the display log.

In another embodiment, a heat radiating faux material is provided for use in an electric fireplace or an electric firepit, the heat radiating faux material selected from the group consisting of a display log, a display stone, a display lava stone, a display ember and a display charcoal, the heat radiating faux material including a body and a heat radiating element therein.

In the heat radiating faux material, the heat radiating element may be a resistive wire.

In the heat radiating faux material, the resistive wire may have a tortuous path.

The heat radiating faux material may further comprise a heat reflective layer.

In the heat radiating faux material, the heat reflective layer may be a black ceramic material.

The heat radiating faux material may be the display log.

The display log may further comprise an interior of the body and a plurality of light emitting diodes in the interior of the body of the display log.

In another embodiment, an electric firepit is provide for use with a power source, the electric firepit comprising: a vessel; a set of display logs housed in the vessel, each display log including a body with a heat radiating element therein; and an electrical line in electrical communication with the heat radiating element of each heat display log.

In the electric firepit, the heat radiating element may be a resistive wire.

In the electric firepit, the resistive wire may have a tortuous path.

In the electric firepit, the body of each display log may include a heat reflective material.

In the electric firepit, the heat reflective material may be a black ceramic material.

In the electric firepit, the set of display logs may be arranged such that the heat reflective material radiates heat outward to an ambient environment.

The electric firepit may further comprise a cap and a plurality of legs extending between the vessel and the cap.

In the electric firepit, the display logs may be arranged in the set such that the heat reflective material radiates heat upwards to the cap.

BRIEF DESCRIPTION OF THE DRAWINGS

FIG. 3A is a longitudinal sectional view of a heat radiating faux log;

FIG. 3B is a longitudinal sectional view of a heat radiating faux stone; FIG. 3C is a longitudinal sectional view of heat radiating faux lava; FIG. 3D is a longitudinal section view of heat radiating faux embers; and FIG. 3E is a longitudinal sectional view of heat radiating faux charcoal.

DESCRIPTION

Figure 1:
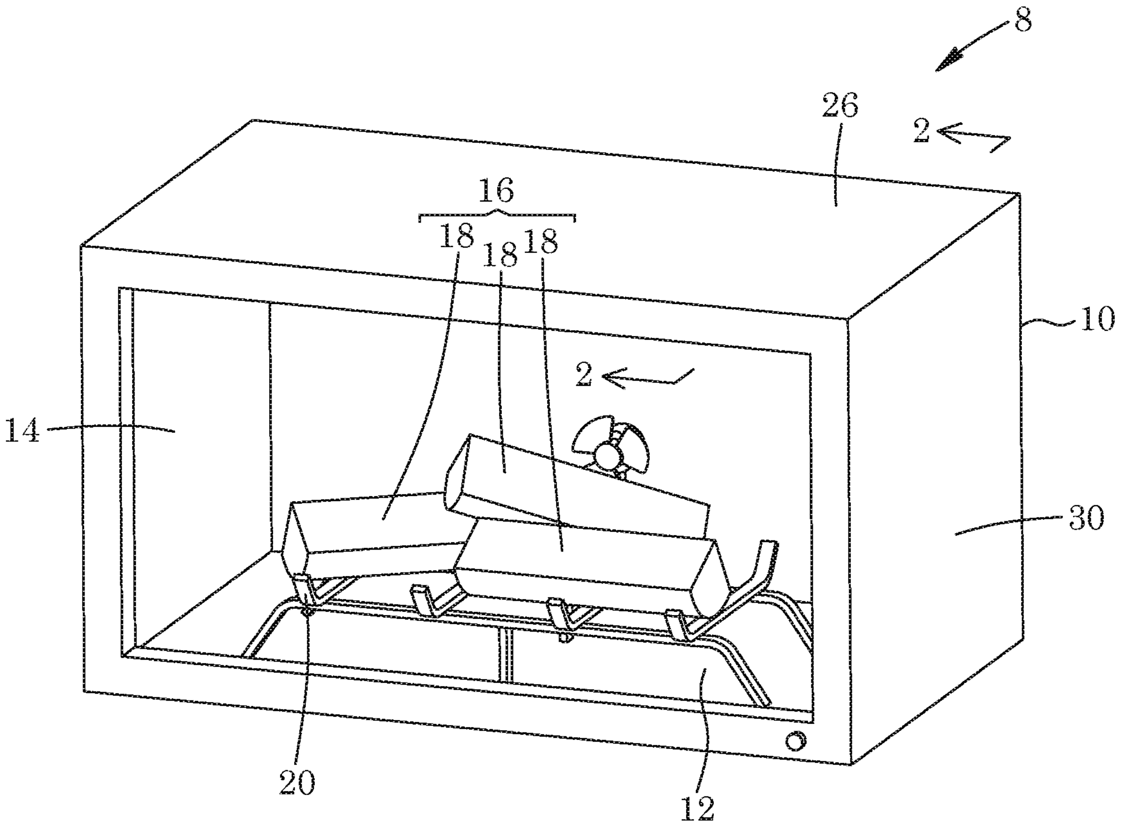
FIG. 1 is a front perspective view of an exemplary electric fireplace of the present technology.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included.

The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Heat radiating element—in the context of the present technology, a heat radiating element includes resistive wire, electrically conductive ceramic material, positive thermal coefficient of resistance (PCT) ceramic materials and PTC rubber materials.

Resistive wire—in the context of the present technology, a resistive wire is a wire or ribbon and include, but are not limited to, "Nichrome" (80% nickel and 20% chromium), FeCrAl or CuNi.

Heat radiating faux materials—in the context of the present technology, heat radiating faux materials are display materials that are used in electric and gas fireplaces that are provided with a heat radiating element. They include, but are not limited to pieces of glass, logs, embers, charcoal, lava rock and stones.

Electrically conductive ceramic material—in the context of the present technology, an electrically conductive ceramic material includes, but is not limited to molybdenum disilicide (MoSi2), silicon carbide, and silicon nitride.

PTC ceramic materials—in the context of the present technology, PCT ceramic materials include, but are not limited to barium titanate-doped ceramics. An advantage of PTC ceramic materials is that they self-regulate temperature, heating quickly, while not rising above a threshold temperature. Typical temperatures are between 0 and 270° C.

PTC rubber materials—in the context of the present technology, PTC rubber materials include, but are not limited to polydimethylsiloxane (PDMS) loaded with carbon nanoparticles with copper wires. An advantage of PTC rubber materials is that they self-regulate temperature, heating quickly, while not rising above a threshold temperature. Typical temperatures are between 0 and 80° C.

DETAILED DESCRIPTION

An exemplary electric fireplace, generally referred to as 8, is shown in FIG. 1. A housing 10 retains a glass front 12 or safety mesh to define an inner space 14. Within the inner space 14 are a set 16 of heat radiating faux logs 18 arranged on a grate 20. The top 26 and the side 30 of the housing 10 are also shown in FIG. 1.

Figure 2:
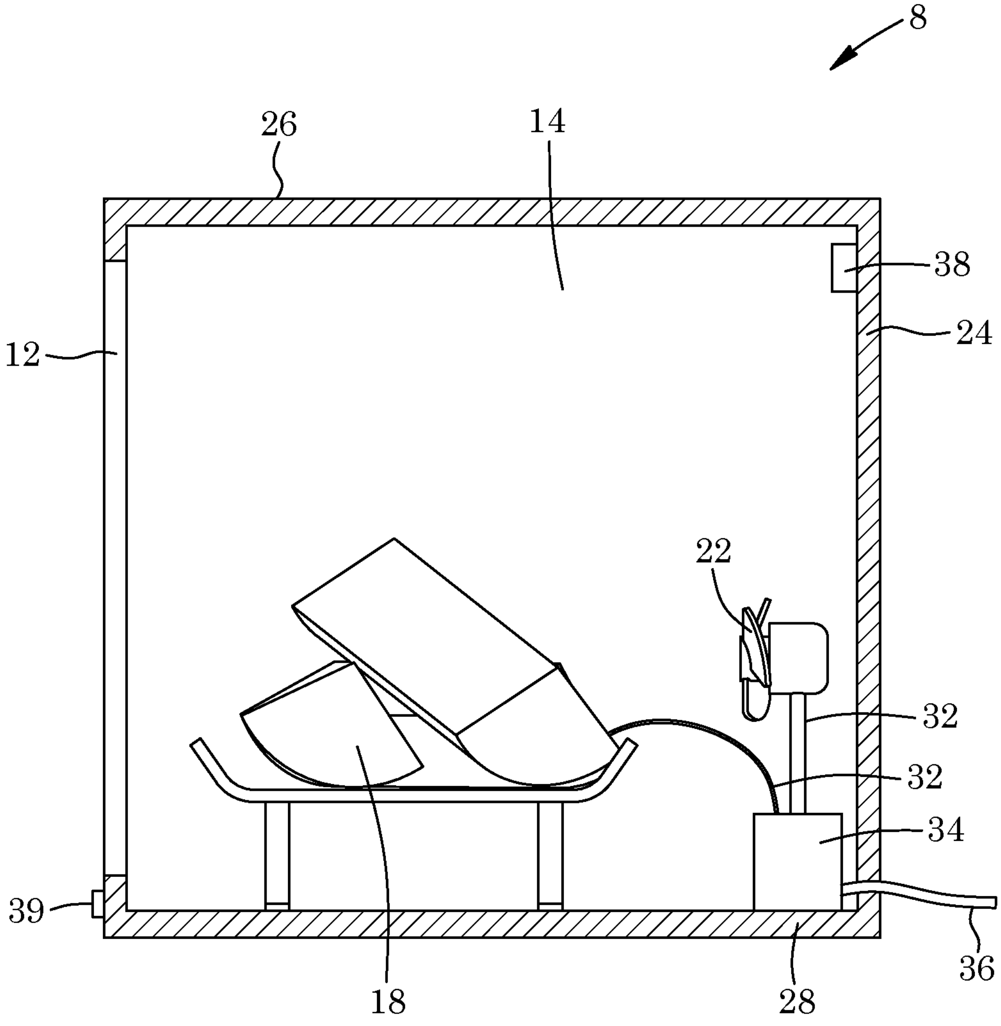
FIG. 2 is a cross sectional view of the electric fireplace of FIG. 1 along lines 2-2.

As shown in FIG. 2, at least one fan 22 is positioned on the back 24 of the housing 10 and is directed to the heat radiating faux logs 18 and the glass front or safety mesh 12, to urge air over the heat radiating faux logs 18 to the glass front or safety mesh 12. In one embodiment, the heat radiating faux logs 18 are heat radiating. In another embodiment, in addition to the logs 18 being heat radiating, one or more of the back 24, the top 26, the bottom 28 and the sides 30 are heat radiating. In another embodiment, the fans 22 may be positioned on one or more of the top 26, the bottom 28 and the sides 30. In yet another embodiment, the fans 22 may be retained within the set 16 of heat radiating faux logs 18. Using one heat radiating faux log 18 as an example, an electrical line 32 extends from the heat radiating faux log 18 to a junction box 34, where all the electrical lines 32 are attached. From the junction box 34, an electrical cable 36 extends to the ambient environment. Similarly, an electrical line 32 extends from the fans 22 to the junction box 34. A thermostat 38 and an on/off switch 39 may be included.

Figure 3A:
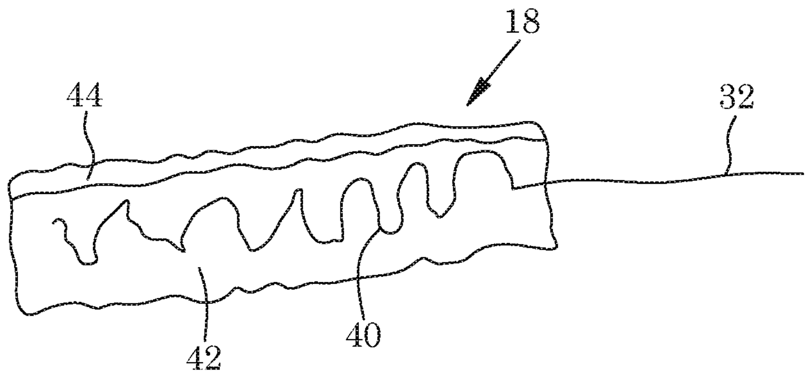
FIGS. 3A-E are longitudinal sectional views of heat radiating faux materials.

As shown in FIG. 3A, each heat radiating faux log 18 includes a heat radiating element 40. It is specifically the heat radiating element 40 of the heat radiating faux log 18 that is connected to the electrical line 32. In one embodiment, the heat radiating element 40 is a resistive wire which is embedded in the body 42 of the heat radiating faux log 18 and extends substantially the length of the heat radiating faux log 18. The resistive wire 40 may be coiled or arranged in another tortuous path to increase the ratio of resistive wire 40 to log body 42. In another embodiment, the resistive wire 40 is substantially straight. The body 42 of the heat radiating faux log 18 includes a heat reflective layer 44 on at least one side, which when positioned in the set 16 of heat radiating faux logs 18, is on the back-facing side, such that heat is reflected towards the glass front 12. The heat reflective layer 44 is composed of, for example, but not limited to, a black ceramic glass or reflective foil.

Figure 3B:
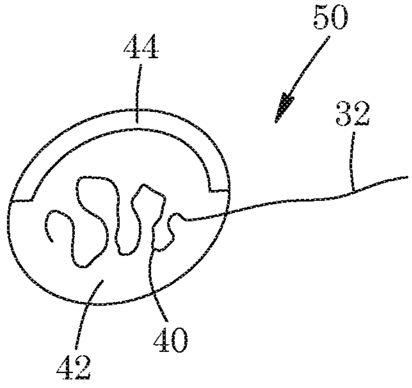

As shown in FIG. 3B, a heat radiating faux stone 50 includes a heat radiating element 40. It is specifically the heat radiating element 40 of the heat radiating faux stone 50 that is connected to the electrical line 32. In one embodiment, the heat radiating element 40 is a resistive wire which is embedded in the body 42 of the heat radiating faux stone 50 and extends substantially the width of the heat radiating faux stone 50. The resistive wire 40 may be coiled or arranged in another tortuous path to increase the length of resistive wire 40. In another embodiment, the resistive wire 40 is substantially straight. The heat radiating faux stone 50 includes a heat reflective layer 44 on at least one side, which when positioned in the set 16 of heat radiating faux stones 50, is on the back-facing side, such that heat is reflected towards the glass front 12. The heat reflective layer 44 is composed of, for example, but not limited to, a black ceramic glass or reflective foil.

Figure 3C:
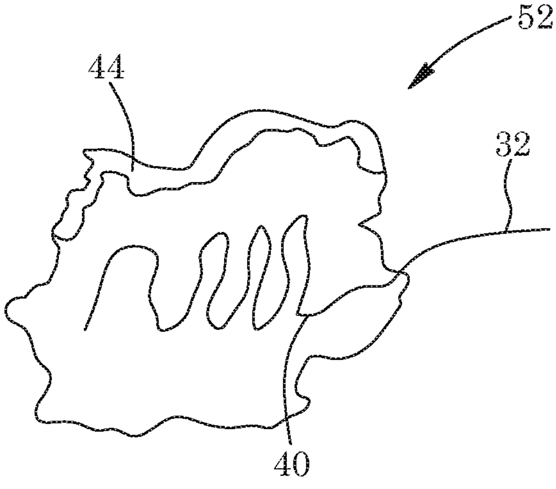

As shown in FIG. 3C, heat radiating faux lava rock 52 includes a heat radiating element 40. It is specifically the heat radiating element 40 of the heat radiating faux lava rock 52 that is connected to the electrical line 32. In one embodiment, the heat radiating element 40 is a resistive wire which is embedded in the heat radiating faux lava rock 52 and extends substantially the width of the heat radiating faux lava rock 52. The resistive wire 40 may be coiled or arranged in another tortuous path to increase the length of resistive wire 40. In another embodiment, the resistive wire 40 is substantially straight. The heat radiating faux lava stone 52 includes a heat reflective layer 44 on at least one side, which when positioned in the set 16 of heat radiating faux lava rock 52, is on the back-facing side, such that heat is reflected towards the glass front 12. The heat reflective layer 44 is composed of, for example, but not limited to, a black ceramic glass or reflective foil.

Figure 3D:
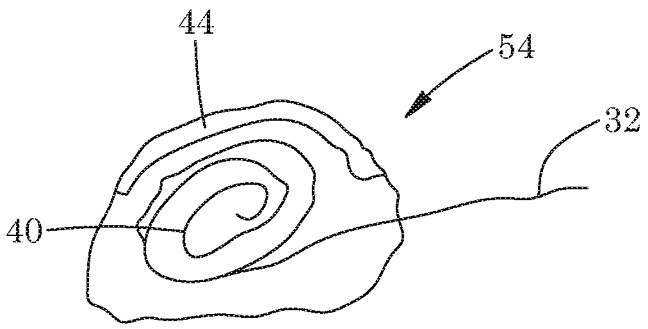

As shown in FIG. 3D heat radiating faux embers 54 include a heat radiating element 40. It is specifically the heat radiating element 40 of the heat radiating faux embers 54 that is connected to the electrical line 32. In one embodiment, the heat radiating element 40 is a resistive wire which is embedded in the heat radiating faux embers 54 and extends substantially the width of the heat radiating faux embers 54. The resistive wire 40 may be coiled or arranged in another tortuous path to increase the length of resistive wire 40. In another embodiment, the resistive wire 40 is substantially straight. The heat radiating faux embers 54 include a heat reflective layer 44 on at least one side, which when positioned in the set 16 of heat radiating faux embers 54, is on the back-facing side, such that heat is reflected towards the glass front 12. The heat reflective layer 44 is composed of, for example, but not limited to, a black ceramic glass or reflective foil.

Figure 3E:
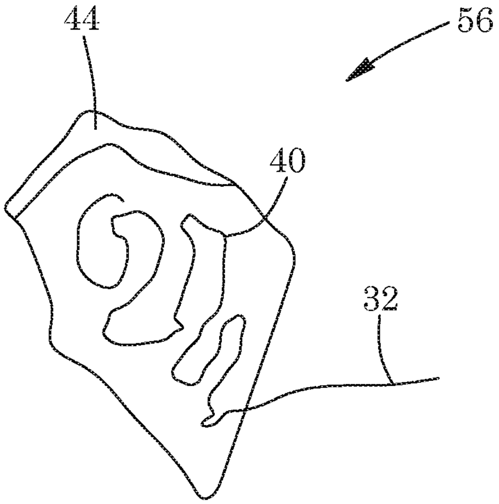

As shown in FIG. 3E heat radiating faux charcoal 56 includes a heat radiating element 40. It is specifically the heat radiating element 40 of the heat radiating faux charcoal 56 that is connected to the electrical line 32. In one embodiment, the heat radiating element 40 is a resistive wire which is embedded in the heat radiating faux charcoal 56 and extends substantially the width of the heat radiating faux lava stone 52. The resistive wire 40 may be coiled or arranged in another tortuous path to increase the length of resistive wire 40. In another embodiment, the resistive wire 40 is substantially straight. The heat radiating faux charcoal 56 includes a heat reflective layer 44 on at least one side, which when positioned in the set 16 of heat radiating faux charcoal 56, is on the back-facing side, such that heat is reflected towards the glass front 12. The heat reflective layer 44 is composed of, for example, but not limited to, a black ceramic glass or reflective foil.

Figure 4:
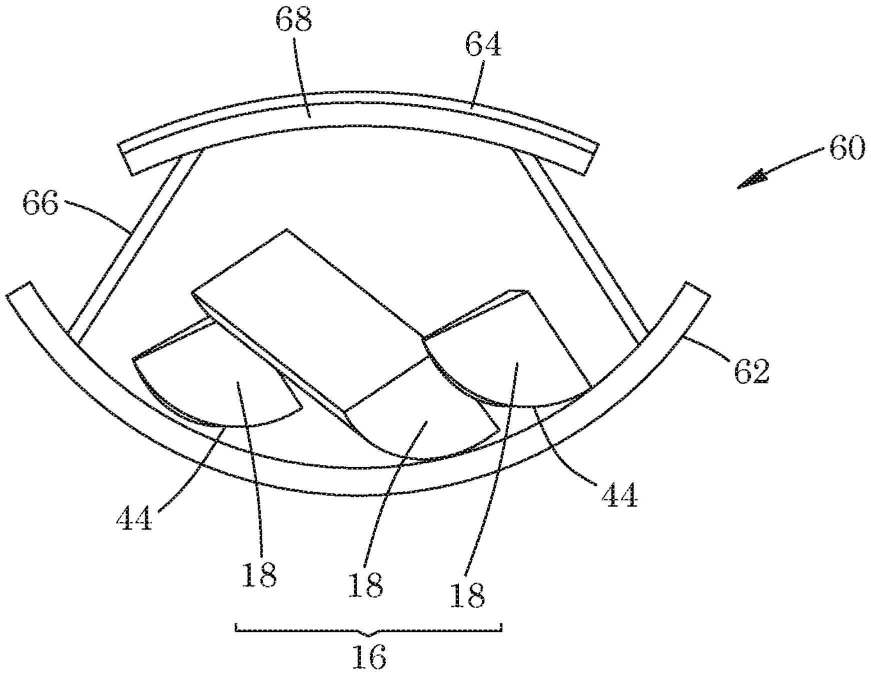
FIG. 4 is a side sectional view of an alternative embodiment of FIG. 1.

An exemplary electric firepit, generally referred to as 60, is shown in FIG. 4. The heat radiating faux logs 18 are arranged in a vessel 62 such that the heat reflective layer 44 radiates the heat outwards into the ambient. As people generally sit all around a firepit, the heat radiating faux logs 18 are positioned as a set 16 to provide 360 degrees of heat. In an alternative embodiment, the heat radiating logs faux 18 are arranged with the heat reflective layers 44 on an underside of the heat radiating faux logs 18 such that heat is directed upwards. A cap 64 is suspended above the heat radiating faux logs 18 on legs 66 that are attached to the vessel 62. The cap 64 includes a heat reflective coating 68 on the underside or is a heat reflective material which deflects the heat outward into the ambient. The cap 64 also functions as a rain shield.

Figure 5:
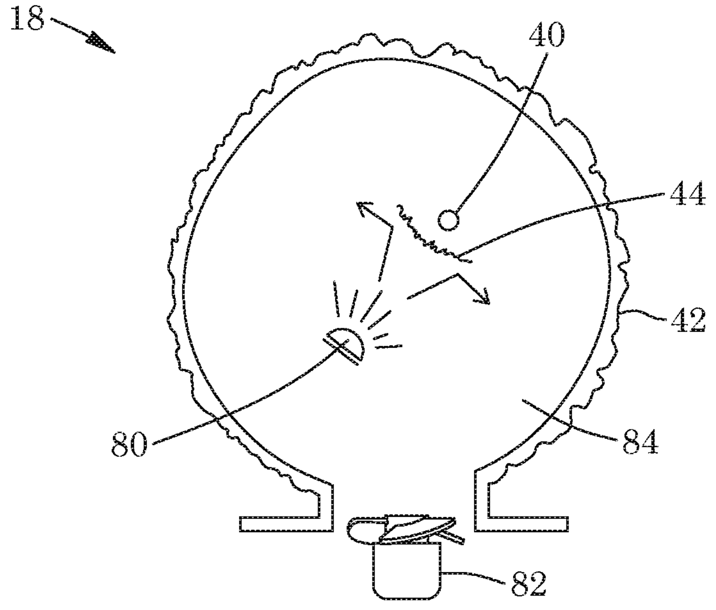
FIG. 5 is a cross sectional view of an alternative embodiment of FIG. 1.

As shown in FIG. 5, the heat radiating faux log 18 includes light emitting diodes 80. The light emitting diodes emit light that is reflected off the heat reflection layer 44 outward into the body 42 of the heat radiating faux log 18. This lights up the heat radiating faux log 18. A fan 82 provides a source of cool air to the interior 84 to cool the light emitting diodes 80. The heat reflective layer 44 is between the light emitting diodes 80 and the heat radiating element 40.

Figure 6:
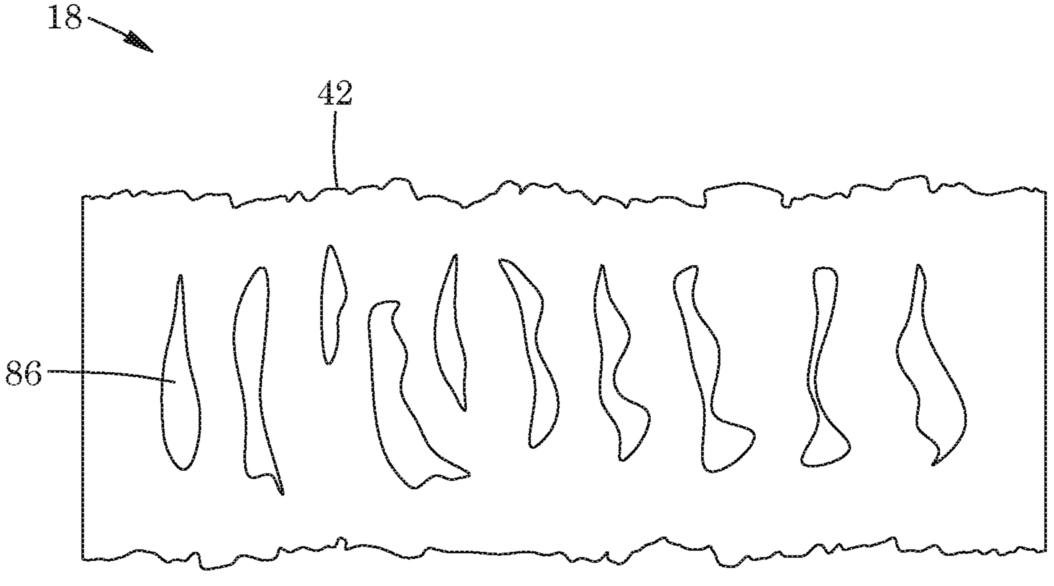
FIG. 6 is plan view of an alternative embodiment of FIG. 1.

As shown in FIG. 6, the heat radiating faux log 18 has slots 86 in the body 42. These slots 82 are in gaseous communication with the interior 84. The fan 82 urges the incoming air into the interior 84 where it is heated and is then expelled through the slots 86 as warm air.

In any of the embodiments, when the fireplace or firepit is in use, the logs may glow as well as putting off heat.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein.

The invention claimed is:

1. An electric fireplace for use with a power source, the electric fireplace comprising: a housing; a glass front or a safety mesh which is retained by the housing, the housing and the glass front or safety mesh defining an inner space; a set of display logs housed in the inner space, each display log comprising a body defined by an external surface with a resistive wire defining a heat radiating element entirely embedded within the body such that it does not protrude past the external surface; and an electrical line in electrical communication with the resistive wire of each display log.

2. The electric fireplace of claim 1, wherein the resistive wire has a tortuous path.

3. The electric fireplace of claim 2, wherein the body of each display log includes a heat reflective material.

4. The electric fireplace of claim 3, wherein the heat reflective material is a black ceramic material.

5. The electric fireplace of claim 4, further comprising at least one fan which is housed in the inner space.

6. A heat radiating faux material for use in an electric fireplace or an electric firepit, the heat radiating faux material comprising a body defined by an external surface with a resistive wire defining a heat radiating element entirely embedded within the body such that it does not protrude past the external surface; and an electrical line in electrical communication with the resistive wire of the heat radiating faux material, wherein the heat radiating faux material is selected from the group consisting of a display log, a display stone, a display lava rock, a display ember and a display charcoal.

7. The heat radiating faux material of claim 6, wherein the resistive wire has a tortuous path.

8. The heat radiating faux material of claim 7, further comprising a heat reflective layer.

9. The heat radiating faux material of claim 8, wherein the heat reflective layer is a black ceramic material.

10. The heat radiating faux material of claim 9, wherein the heat radiating faux material is the display log.

11. The heat radiating faux material of claim 10, wherein the display log further comprises an interior of the body and a plurality of light emitting diodes in the interior of the body of the display log.

12. An electric firepit for use with a power source, the electric firepit comprising: a bowl; a set of display logs housed in the bowl, each display log comprising a body defined by an external surface with a resistive wire defining a heat radiating element entirely embedded within the body such that it does not protrude past the external surface; and an electrical line in electrical communication with the resistive wire of each of each display log.

13. The electric firepit of claim 12, wherein the resistive wire has a tortuous path.

14. The electric firepit of claim 13, wherein the body of each display log includes a heat reflective material.

15. The electric firepit of claim 14, wherein the heat reflective material is a black ceramic material.

16. The electric firepit of claim 15 further comprising a cap which includes an underside, the underside having a heat reflective coating, and a plurality of legs extending between the bowl and the cap.

17. The electric firepit of claim 16, wherein the set of display logs is arranged such that the heat reflective material radiates heat upwards to the cap.

* * * * *